United States Patent [19]
Lee

[11] Patent Number: 5,606,766
[45] Date of Patent: Mar. 4, 1997

[54] JOINT BUSHING DEVICE FOR A WINDSHIELD WIPER FRAME

[76] Inventor: Albert Lee, 232 Margate Rd., Timonium, Md. 21093

[21] Appl. No.: 537,365

[22] Filed: Oct. 2, 1995

[51] Int. Cl.⁶ .................................. B60S 1/38; B60S 1/04
[52] U.S. Cl. .................................. 15/250.46; 15/250.44; 403/79; 403/363
[58] Field of Search .......................... 15/250.46, 250.47, 15/250.43, 250.44, 250.32, 250.31; 403/79, 363, 159, 163

[56] References Cited

U.S. PATENT DOCUMENTS

| | | | |
|---|---|---|---|
| 4,180,885 | 1/1980 | Thornton et al. | 15/250.46 |
| 4,286,351 | 9/1991 | Mower et al. | 15/250.46 |
| 4,675,934 | 6/1987 | Dal Palta | 15/250.46 |
| 4,794,664 | 1/1989 | Arai | 15/250.46 |
| 4,953,251 | 9/1990 | Chow | 15/250.46 |
| 5,073,060 | 12/1991 | Pethers | 15/250.46 |
| 5,090,086 | 2/1992 | Journee et al. | 15/250.46 |
| 5,289,608 | 3/1994 | Kim | 15/250.32 |

FOREIGN PATENT DOCUMENTS

| | | | |
|---|---|---|---|
| 775964 | 5/1957 | United Kingdom | 15/250.44 |
| 2202899 | 10/1988 | United Kingdom | 15/250.46 |

*Primary Examiner*—Gary K. Graham
*Attorney, Agent, or Firm*—Birch, Stewart, Kolasch & Birch, LLP

[57] ABSTRACT

An improved joint bushing device includes a pair of outer pins and a pair of inner pins symmetrically disposed on a pair of walls and a pair of primary yoke members having a pair of downward grooves and yoke apertures for effectively assembling with a bridge member having a pair of bridge apertures and the pair of primary yoke members.

8 Claims, 1 Drawing Sheet

JOINT BUSHING DEVICE FOR A WINDSHIELD WIPER FRAME

BACKGROUND OF THE INVENTION

1. Field of the Invention

The present invention relates generally to the construction of a windshield wiper frame and more particularly, to a joint bushing device for use in the windshield wiper frame of the windshield wiper assembly for a motor vehicle for effectively assembling with all parts and improving the performance of the windshield wiper assembly.

2. Description of Related Art

Various types of windshield wiper frames for a windshield wiper assembly are well known in the art. As shown in FIG. 1., such windshield wiper frames include a bridge 3, a pair of primary yokes 2 pivotally connected to the bridge 3 by using a bushing 1 which contains a pair of depending bushing walls 4, a pair of short inner pins 8 projecting from opposing inside surfaces of the bushing walls 4 and long outer pins 7 projecting from outer surfaces of the bushing walls 4. At this time, the pair of short inner pins 8 are inserted into a pair of inner apertures 9 formed in the primary yokes 2, and the pair of long outer pins 7 are inserted into a pair of outer apertures 9' of the bridge 3.

However, even though the conventional bushing 1 has the pair of outer and inner pins 7 and 8, when the primary yoke 2 is inserted into the bushing 1, the pair of inner pins 8 are usually crushed or broken off of the bushing. Due further to the tight fit of the bushing 1 to the primary yoke 2, a substantial amount of power is needed to push the primary yoke 2 to the point where the inner pins 6 will reach the inner apertures 9 for seating therein. Therefore, there are a number of damaged goods and the assembling cost is high. In addition, the windshield wiper frame having such a conventional bushing 1 cannot be expected to improve the performance of the windshield wiper assembly.

SUMMARY OF THE INVENTION

Accordingly, it is an object of the present invention to provide an improved windshield wiper frame for use in a windshield wiper assembly for motor vehicles, which eliminates the above problems encountered with the conventional windshield wiper frame.

Another object of the present invention is to provide an improved joint bushing member including a pair of outer pins and a pair of inner pins disposed on a pair of bushing walls for effectively assembling with a bridge member and a primary yoke member with a pair of downward grooves formed in the primary yoke member.

A further object of the present invention is to provide a primary yoke member having a tapered configuration at a pair of yoke walls thereof, for smoothly receiving a joint bushing member and securely locking with the pair of inner pins of the joint bushing member.

Still another object of the present invention is to provide a joint bushing device for use in a windshield wiper frame, which is simple in structure, inexpensive to manufacture, durable in use, and refined in appearance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to an improved joint bushing device including a pair of outer pins and a pair of inner pins symmetrically disposed on a pair of walls and a pair of primary yoke members having a pair of downward grooves formed therein and yoke apertures for effectively assembling with a bridge member having a pair of bridge apertures and the pair of primary yoke members.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 2:
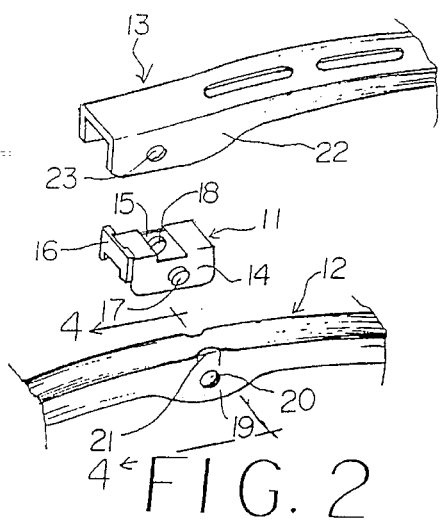
FIG. 2 is an exploded perspective view of the joint bushing device for use in a windshield wiper frame at a bushing connecting portion thereof according to the present invention.
Figure 3:
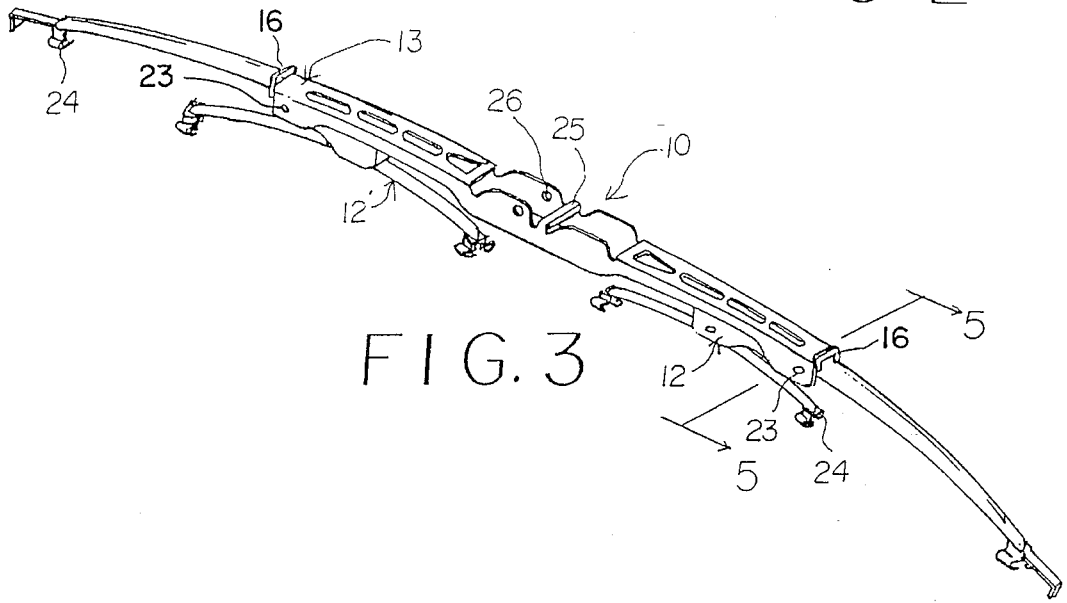
FIG. 3 is a perspective view of the windshield wiper frame including the joint bushing device according to the present invention.

Referring now in detail to the drawings for the purpose of illustrating preferred embodiments of the present invention, the windshield wiper frame 10 for use in a windshield wiper assembly for a motor vehicle as shown in FIGS. 2 and 3, comprises a wiper arm attached to the body of the motor vehicle (see the inventor's U.S. Pat. No. 5,311,636), a bridge member 13, a pair of primary yokes 12 pivotally connected to the bridge member 13, and a pair of secondary yokes 12' pivotally connected to an inner end of the pair of primary yokes 12. Distal ends of the pair of secondary yokes 12' and the outer ends of the pair of primary yokes 12 are provided with a claw 24, respectively.

The bridge member 13 further includes a joint bushing member 11 for pivotal connection to the primary yokes 12, a shaft 25 extended from a central portion of the bridge member 13, and apertures 26 formed in the bridge member 13 for engaging the wiper arm (not shown). The primary yokes 12 are pivotally connected to the secondary yokes 12' by the joint bushing member 11.

As shown in FIG. 2, the joint bushing device of the present invention comprises the joint bushing member 11, a downward groove 21 formed on outer side surfaces of each primary yoke 12, and an inner aperture 20 formed in each yoke wall 19 of both the primary 12 and the secondary yokes 12'. If necessary, a third yoke (not shown) may be provided for pivotally connecting to the primary and secondary yokes 12 and 12' or the secondary yokes 12' and third yokes.

Figure 1:
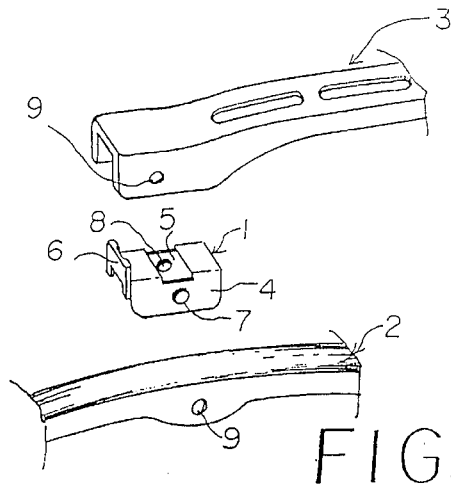
FIG. 1 is an exploded perspective view of a conventional windshield wiper frame at a bushing connecting portion thereof.
Figure 5:
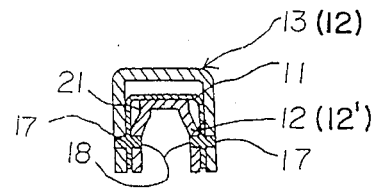
FIG. 5 is a cross-sectional view taken along line 5—5 of FIG. 3.

As shown in FIGS. 2 and 5, the joint bushing member 1 is of a U-shape in cross-section and includes a pair of bushing side walls 14, an opening 15 formed in an end wall, a pair of opposing outer pins 17 and a pair of opposing inner pins 18 disposed on and extended from outer and inner bushing wall surfaces 14, respectively, and a stopper 16 formed at one edge of the bushing member and perpendicular to the side walls 14. The pair of inner pins 18 and the pair of outer pins 17 have a uniform length and are longer than the inner and outer pins 8 and 7 of the conventional joint bushing 1 as shown in FIG. 1, for easily and tightly locking into the inner apertures 20 of the primary yokes 12 and the outer apertures 23 of the bridge walls 22 of the bridge member 13, respectively (FIG. 2).

Figure 4:
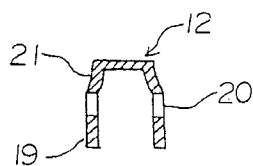
FIG. 4 is a cross-sectional view of the bushing connecting portion of a primary yoke member according to the present invention, taken along line 4—4 of FIG. 2.

As shown in FIG. 4, the secondary yoke 12 has a tapered configuration since the secondary yoke 12 has the downwardly formed grooves 21, so that when the joint bushing member 11 is locked into both the bridge member 13 and the primary yoke 12, the joint bushing member 11 is easily and smoothly covered onto and locked into the primary yoke 12, and both pairs of outer and inner pins 17 and 18 are tightly and securely locked into both inner and outer apertures 20 and 22 of the primary yoke 12 and the bridge member 13, respectively. (FIG. 5). The bushing member 11 is made of polymer plastics or nylon for eliminating metal to metal contact so as to prevent corrosion and provide quiet operation and longer life thereof.

Accordingly, the joint bushing device of the present invention provides a space at the end thereof, when the bushing member 11 is assembled with the primary yoke 12 and the bridge member 13, for providing adequate room for the primary yoke 12 to move flexibly and evenly distribute its pressure, and further enables the inner pins 18 of bushing member 11 to slide within the downward grooves 21 for easily assembling by a snap-fit into the apertures 20, thereby saving labor costs and securely locking into the primary yoke 12 and the bridge member 13 so as to improve the performance of the windshield wiper assembly.

Also, the joint bushing device according to the present invention is simple in structure, inexpensive to manufacture, durable in use, and refined in appearance.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A windshield wiper frame assembly of a motor vehicle, comprising:

a bridge member including an arm shaft extended therefrom and an arm aperture for attaching to a wiper arm attached to a body of said motor vehicle, said bridge member further including a pair of depending bridge walls formed on opposing ends thereof and a pair of outer apertures formed in said bridge walls;

a joint bushing member including a pair of bushing side walls, a top opening, outer and inner pins extending from each wall of said pair of bushing walls, and a stopper formed at one end of said joint bushing member; and at least one yoke member including a pair of yoke walls disposed on the middle portion thereof, a pair of grooves formed in outer side walls of the yoke member, and a pair of inner apertures formed within the side walls of the yoke member, the pair of grooves terminating above the pair of inner apertures whereby when the yoke member is pivotally assembled with the bridge member by inserting the joint bushing member between the yoke and bridge members, the pair of inner pins of the joint bushing member slidably follow the pair of grooves and are snap-fit into the outer apertures by inner pins of the joint bushing member.

2. The joint bushing device of claim 1, wherein said yoke member provides a tapered configuration at the middle portion having the pair of yoke walls for securely receiving the joint bushing member.

3. The joint bushing device of claim 2, wherein said yoke member further includes a primary yoke member pivotally connected to said bridge member by using said joint bushing member, wherein the pair of outer pins of the joint bushing member are locked into the inner apertures of the primary yoke member.

4. The joint bushing device of claim 1, wherein said at least one yoke member includes a primary yoke member and a secondary yoke member pivotally connected to said primary yoke member with said joint bushing member.

5. The joint bushing device of claim 1, wherein said outer and inner pins of said joint bushing member are the same length.

6. The joint bushing device of claim 5, wherein said joint bushing member is made of nylon plastic.

7. The joint bushing device of claim 1, wherein said joint bushing member is made of nylon plastic.

8. The joint bushing device of claim 1, wherein the pair of grooves formed in the outer side walls of the yoke member are tapered from a narrow portion at an upper surface of the yoke to a wider portion terminating above the pair of inner apertures.

* * * * *